United States Patent [19]

O'Banion

[11] 4,265,752
[45] May 5, 1981

[54] SELF VENTING GAS CAP

[75] Inventor: John D. O'Banion, Arlington, Tex.

[73] Assignee: E-Z Fill Corporation, Arlington, Tex.

[21] Appl. No.: 907,693

[22] Filed: May 19, 1978

Related U.S. Application Data

[63] Continuation-in-part of Ser. No. 765,452, Feb. 3, 1977, Pat. No. 4,091,959, and a continuation-in-part of Ser. No. 805,205, Jun. 9, 1977, Pat. No. Des. 250,468, and a continuation-in-part of Ser. No. 805,497, Jun. 10, 1977, Pat. No. Des. 250,466, and a continuation-in-part of Ser. No. 805,504, Jun. 10, 1977, Pat. No. Des. 250,467.

[51] Int. Cl.³ .................. B65D 51/16; B65D 51/24
[52] U.S. Cl. .................... 210/172; 137/493; 210/452; 220/208; 220/209; 220/254; 220/303; 220/86 R
[58] Field of Search ............. 220/303, 88 A, 86 R, 220/288, 344, 254, 86 AT, 208, 209, 203, 293; 141/348; 296/1 C; 280/5 A; 55/507, 378, 379; 210/420, 452, 172; 137/493, 493.7

[56] References Cited

U.S. PATENT DOCUMENTS

| D. 250,466 | 12/1978 | O'Banion | D12/197 |
|---|---|---|---|
| D. 250,467 | 12/1978 | O'Banion | D9/254 X |
| D. 250,468 | 12/1978 | O'Banion | D12/197 |
| 729,272 | 5/1903 | Burney | 220/344 X |
| 1,120,313 | 12/1914 | Kessler | 220/88 A X |
| 1,553,395 | 9/1925 | Ressler et al. | 210/172 |
| 1,563,472 | 12/1925 | Cohn | 220/86 R |
| 1,695,248 | 12/1928 | Crompton | 137/493.7 |
| 2,010,445 | 8/1935 | Sparks | 220/86 R |
| 2,107,600 | 2/1938 | Darms | 220/86 R |
| 2,247,509 | 7/1941 | Lebus | 220/86 R |
| 2,414,909 | 1/1947 | Snyder | 220/86 R X |
| 2,534,003 | 12/1950 | Culver et al. | 220/86 R |
| 2,619,113 | 11/1952 | Myers et al. | 137/493 |
| 2,695,161 | 11/1954 | Lebus | 220/86 R X |
| 2,801,767 | 8/1957 | Mariani | 220/86 R |
| 2,835,269 | 5/1958 | Seymour | 220/344 X |
| 3,757,987 | 9/1973 | Marshall | 220/303 |
| 3,911,977 | 10/1975 | Berger | 220/86 R X |
| 3,937,358 | 2/1976 | Smith et al. | 220/207 |
| 3,942,962 | 3/1976 | Duyckinck | 55/302 |
| 4,091,959 | 5/1978 | O'Banion | 220/86 R X |

FOREIGN PATENT DOCUMENTS

| 1001057 | 1/1957 | Fed. Rep. of Germany | 220/203 |
|---|---|---|---|
| 1394015 | 5/1975 | United Kingdom | 220/203 |

Primary Examiner—Allan N. Shoap
Attorney, Agent, or Firm—Gerald G. Crutsinger; John F. Booth; Harry C. Post, III

[57] ABSTRACT

A closure for the filler neck on a vehicle gas tank having a closure body with a central passage and an upper surface having a vent groove formed therein. The vent groove has a first end communicating with the hollow portion of the closure body and a second end adjacent the periphery of the closure body. A cap is secured to the closure body and a resilient gasket is secured between the cap and the upper surface of the closure body such that a convex surface formed on the cap engages the upper surface of the gasket adjacent the vent groove in a closure body to deflect a portion of the gasket into the groove to seal the vent groove. The gasket is sufficiently resilient to permit passage of fluid through the vent groove when a pressure differential exceeding a predetermined magnitude exists between the first and second ends of the vent groove such that pressure within the tank is vented to the atmosphere. A door having a periphery formed by a smooth, continuous convex surface is hingedly secured over the central passage through the closure body and is adapted to receive a gasoline nozzle which moves the door out of the path of the nozzle. The door is spring-urged upwardly into sealing engagement with the lower portion of the resilient gasket such that a negative pressure within the tank is relieved by drawing the door away from the gasket to allow equalization of the pressure. A modified form of the cap has a second door in a lower portion thereof to exclude nozzles exceeding a predetermined size and a screen and anti-syphoning device secured to the lower end thereof.

18 Claims, 26 Drawing Figures

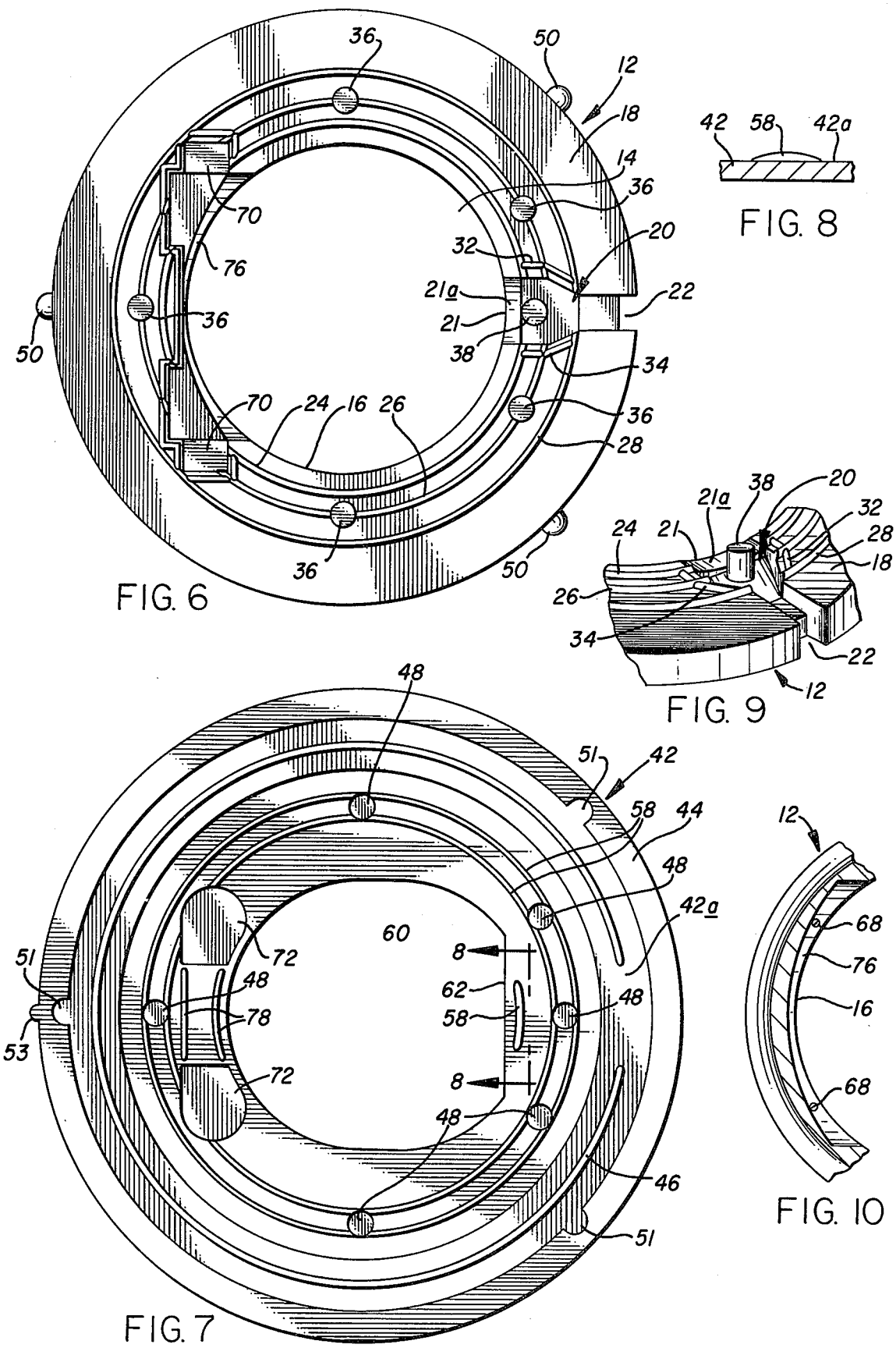

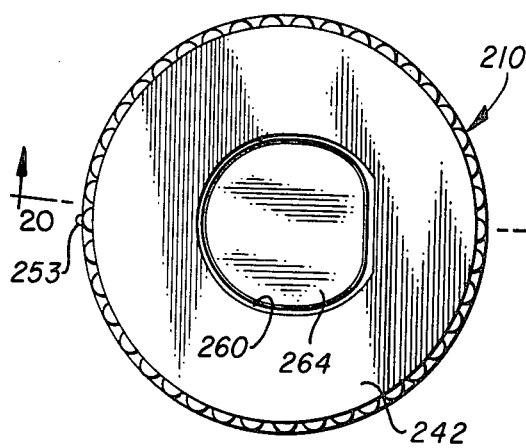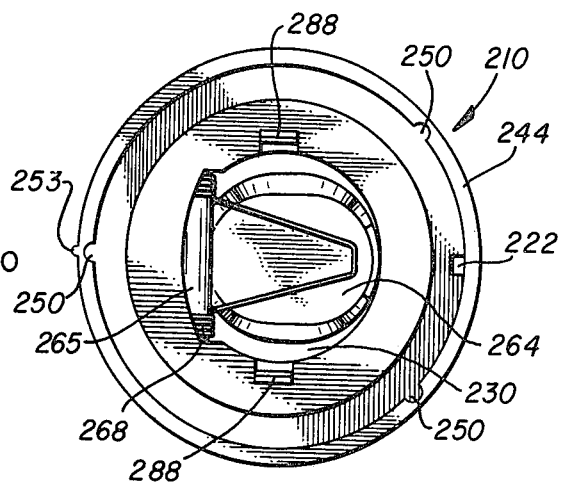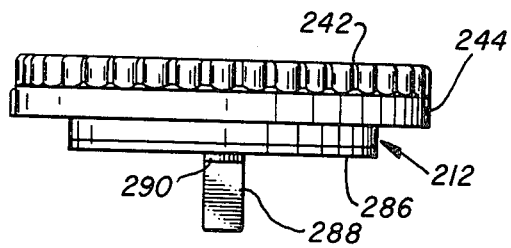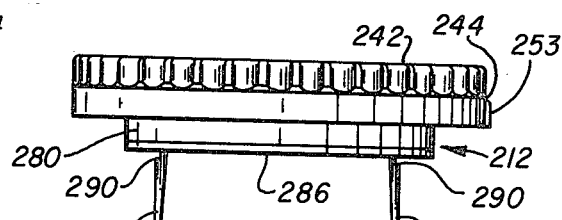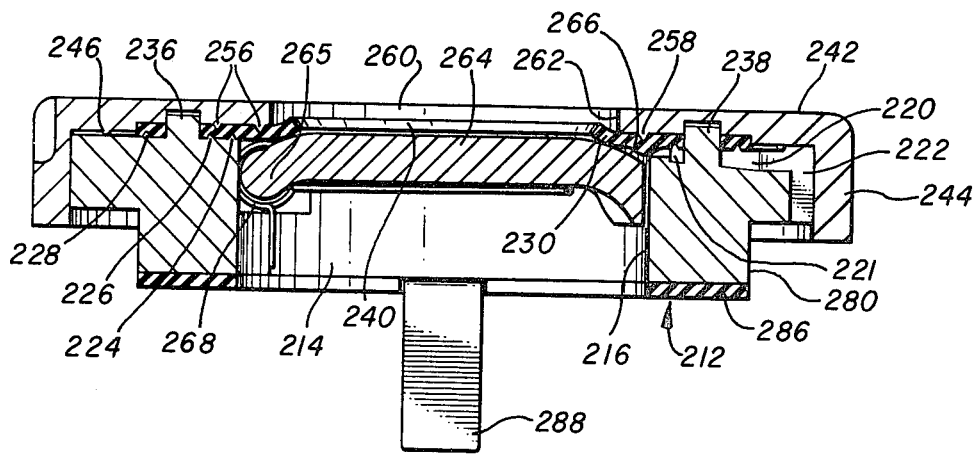

SELF VENTING GAS CAP

CROSS-REFERENCE TO RELATED APPLICATIONS

This is a continuation-in-part of my co-pending application Ser. No. 765,452, filed Feb. 3, 1977, entitled "Gas Cap", now U.S. Pat. No. 4,091,959 issued May 30, 1978; Design application Ser. No. 805,205, filed June 9, 1977, entitled "Gas Tank Cap" now U.S. Pat. No. Des. 250,468; design application Ser. No. 805,497, filed June 10, 1977, entitled "Tank Closure" now U.S. Pat. No. Des. 250,466; and design application Ser. No. 805,504, filed June 10, 1977, entitled "Tank Cap" now U.S. Pat. No. Des. 250,467.

BACKGROUND

As a result of a shortage of fuel, inflation of gasoline prices and high labor costs, self-service gasoline stations from which gasoline is purchased at a reduced rate have become popular. However, for various reasons, some customers have not utilized self-service gasoline pumps to a maximum extent.

The cap on a gasoline tank is often covered with dirt and grease which results in a strong likelihood that the customer will soil his hands and possibly his clothes when the cap is removed to fill the fuel tank and replaced.

In view of emission control standards established to protect the environment, vehicle designers have developed systems to prevent leakage of fuel and vapor from the fuel tank. Improper connection of the gas cap to a vehicle fuel tank presents a potential fire hazard and also permits leakage of vapor from the tank of the vehicle.

In addition to numerous problems encountered by unskilled persons removing and replacing the gas cap, service station attendants occasionally forget to replace the cap or improperly replace it resulting in loss of the gas cap.

U.S. Pat. Nos. 1,810,019; 1,818,608; 1,982,879; 2,503,031; 2,593,712; 2,657,824; 2,765,948; and 3,897,810 disclose self closing caps for fuel tanks, radiators and the like.

U.S. Pat. No. 3,911,977 and Canadian Pat. No. 999,247 disclose filler necks having an unleaded door contained therein.

U.S. Pat. No. 3,937,358 discloses a venting system. Systems of this type are unduly complicated increasing the cost of the cap and problems which may occur causing premature failure.

Self closing caps heretofore devised are not suitable for replacement of the conventional gas cap, radiator caps and the like on modern vehicles without substantially modifying the neck of the tank. Self-closing caps heretofore devised have not offered sealing capability required to meet existing emission control regulations and to permit use of the cap or filling the tank without removing the cap or alternately to permit removal of the cap if deemed expedient to do so without the use of tools.

SUMMARY

I have devised a self-closing gasoline cap which automatically compensates for vacuum pressure or increased pressure within the tank to replace the factory equipped cap on today's automobile without modifying the filler tube on the vehicle.

The closure is secured to the filler neck having a closure body with a central passage formed therethrough and an upper surface having a vent groove formed therein with the vent communicating with the central passage of the closure body and a second end communicating with the ambient atmosphere through the periphery of the closure body. A cap is secured to the closure to secure a resilient gasket between the cap and the upper surface of the closure body, said gasket having a central passage formed therethrough. A convex surface formed on the cap engages the upper surface of the gasket, adjacent the vent groove in the closure body, to deflect a portion of the gasket into the vent groove to resiliently seal the vent groove. The gasket is sufficiently resilient to permit fluid to flow through the vent groove when a pressure differential exceeding a predetermined amount exists between the central passage and the ambient atmosphere at each end of the groove. If a positive pressure exists in the central passage on the first end of the vent groove, actuating means urges the resilient gasket upwardly to allow pressure to escape to ambient atmosphere to equalize the pressure in the tank and the exterior. If a vacuum pressure exists in the tank, the actuating means is drawn downwardly to allow venting of the tank to ambient atmosphere to increase the pressure within the tank and equalize the pressure.

The cap further has a closure member which is spring-urged upwardly to engage the lower surface of the gasket to seal about the periphery thereof to allow insertion of the nozzle through the gap cap. The rounded surface of the door provides a tapered sealing surface and a surface which will not bind with the nozzle when withdrawing it from the gas cap.

A modified form of the device has a second door for excluding nozzles above a predetermined size as required by EPA standards and an anti-theft screen and filter secured below the second door.

A primary object of the invention is to provide a self closing, self-venting gas cap which seals off the tank to prevent escape of gasoline vapors from the tank unless the pressure within the tank exceeds a predetermined amount and to equalize pressure within the tank if a vacuum is formed in the tank below a predetermined amount to prevent collapsing of the gasoline tank.

A further object of the invention is to provide a gas cap for use on modern automobiles presently in use which is adapted to be used with unleaded and regular gas without modifying the filler tube of the vehicle.

A further object of the invention is to provide a self-closing gas cap which complies with governmental requirements and which will allow persons using self-service gas pumps to fill their tanks without removing the cap therefore reducing the possibility of soiling their hands and clothes as well as reducing the possibility of misplaced gas caps.

A further object of the invention is to provide a gas cap which is self-venting through a simple vent to allow equalization of the pressure within the tank to prevent explosion or collapse of the gas tank.

A still further object of the invention is to provide a cap which is detachably secured to the neck of the gas tank to allow it to be removed without special tools and which would minimize improper placement of the gas cap on the neck thereby minimizing leakage of vapors, emissions and other types of pollution into the atmosphere.

A still further object of the invention is to provide a gas cap having an anti-theft and filter screen secured thereto to minimize losses of gasoline and contamination of the tank when using a self-opening type cap.

Other and further objects of the invention will become apparent upon referring to the detailed description hereinafter following and to the drawings annexed hereto.

DESCRIPTION OF THE DRAWINGS

Drawings of the four embodiments of the invention are annexed hereto so that the invention may be better and more fully understood, in which:

FIG. 6 is a top plan view of the closure body with the cap removed to more clearly illustrate the details of construction;

FIG. 7 is a bottom plan view of the cap;

FIG. 8 is a cross-sectional view taken along line 8—8 of FIG. 7;

FIG. 9 is perspective view of the vent groove;

FIG. 10 is a cross-sectional view taken along line 10—10 of FIG. 5;

FIG. 16 is a top plan view of the third modified form of the gas cap;

FIG. 17 is a bottom plan view thereof;

FIG. 18 is a front elevational view thereof;

FIG. 19 is a side elevational view thereof;

FIG. 20 is a cross-sectional view taken along line 20—20 of FIG. 16;

Numeral references are used to designate like parts throughout the various figures of the drawing.

DESCRIPTION OF A PREFERRED EMBODIMENT

Figure 1:
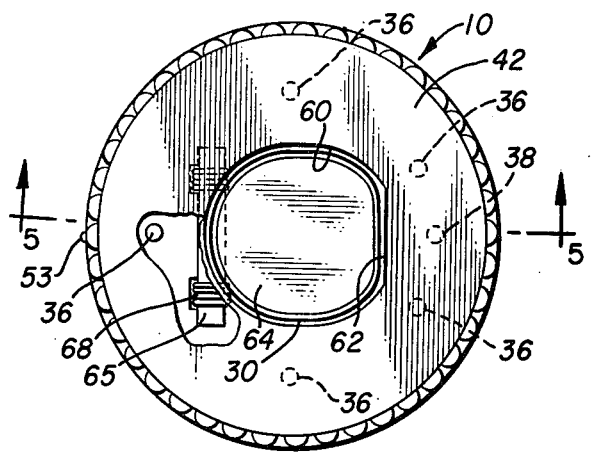
FIG. 1 is a top plan view of the gas cap with parts broken away to more clearly illustrate the details of construction.
Figure 2:
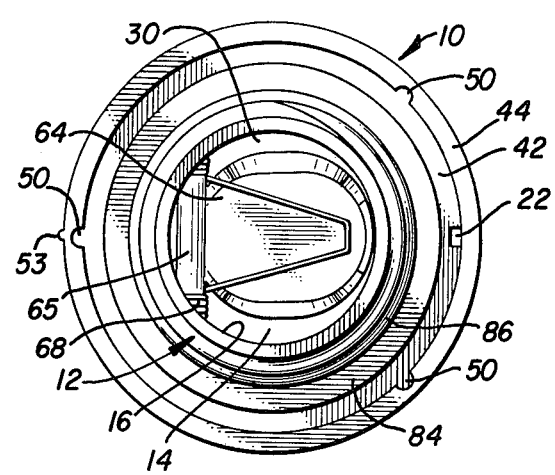
FIG. 2 is a bottom plan view thereof.
Figure 3:
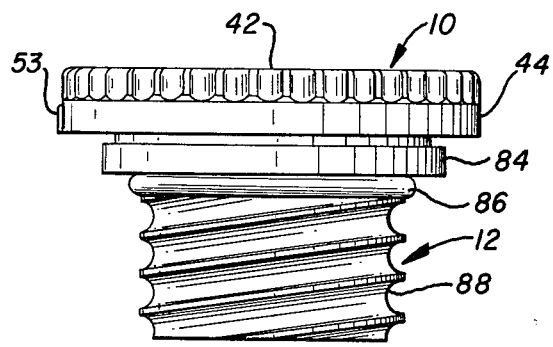
FIG. 3 is a front elevational view thereof.
Figure 4:
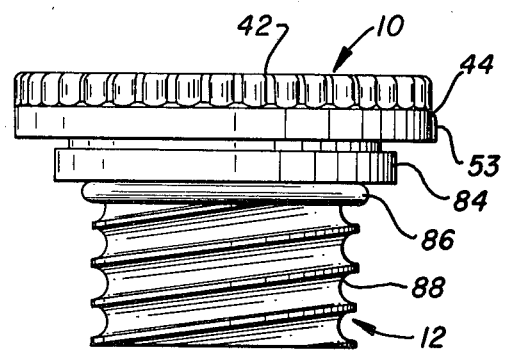
FIG. 4 is a side elevational view thereof.

Generally referring to FIGS. 1-10, the first embodiment of the gas cap is generally designated 10. The gas cap 10 illustrated in FIGS. 1-10 is generally of the configuration to fit on a General Motors type gas tank.

Referring to FIGS. 2-5, the closure 10 generally comprises a closure body 12 having a central passage 14 formed therethrough having a bore wall 16. The upper surface 18 has a vent groove 20 having a first end 21 communicating with the central passage 14 and a second end 22 communicating with the periphery of the closure body 12. It should be readily apparent from FIG. 9 that the first end 21 of vent groove 20 forms a concave entrance surface 21a communicating with a shallow, wide groove which is tapered into a narrow, deep groove at end 22. The cross-sectional area across the vent groove 20 is preferably the same along the axis of the groove although the dimensions are not equal.

Figure 5:
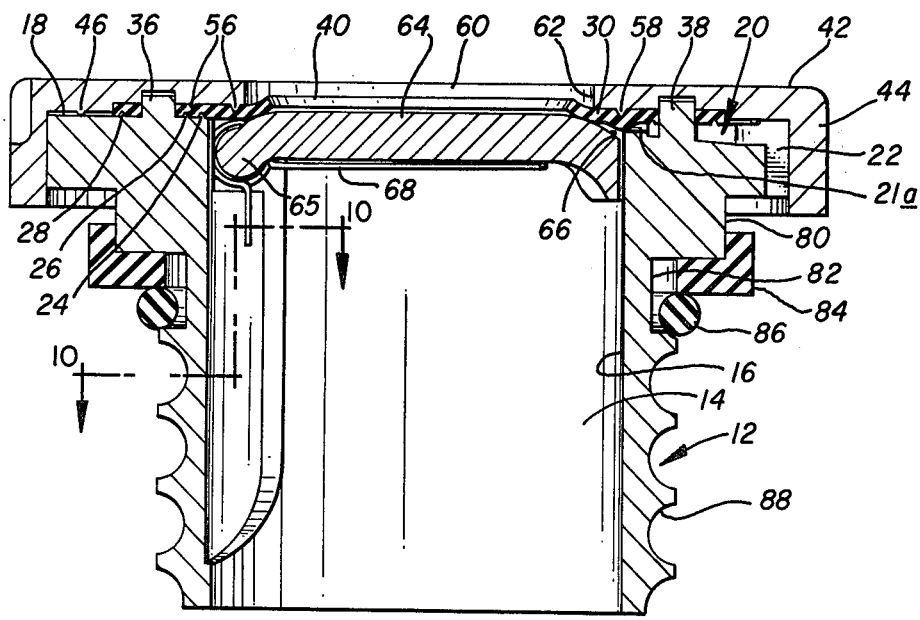
FIG. 5 is a cross-sectional view taken along line 5—5 of FIG. 1.
Figure 11:
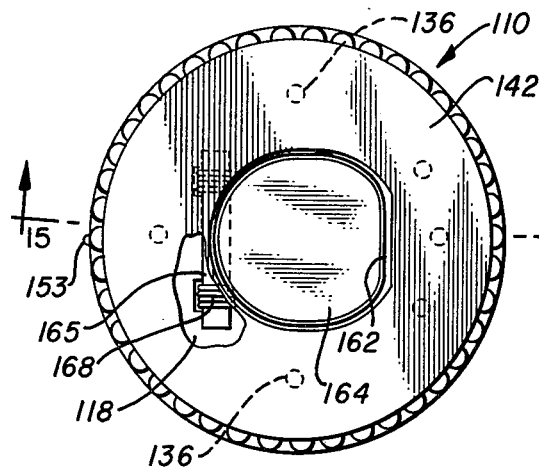
FIG. 11 is a top plan view of a second modified form of the gas cap with parts broken away to more clearly illustrate the details of construction.
Figure 12:
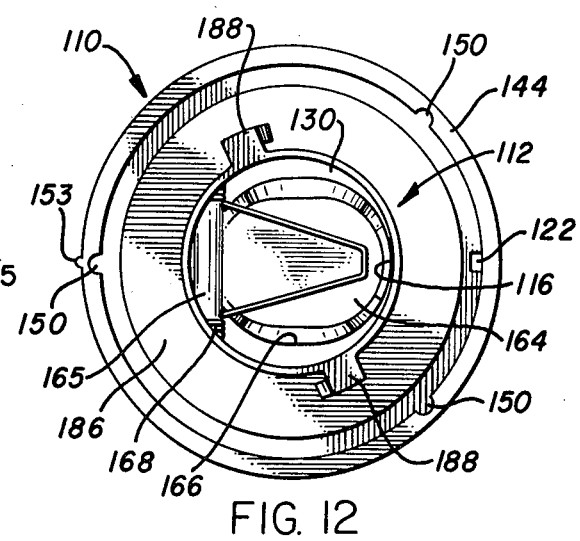
FIG. 12 is a bottom plan view thereof.
Figure 13:
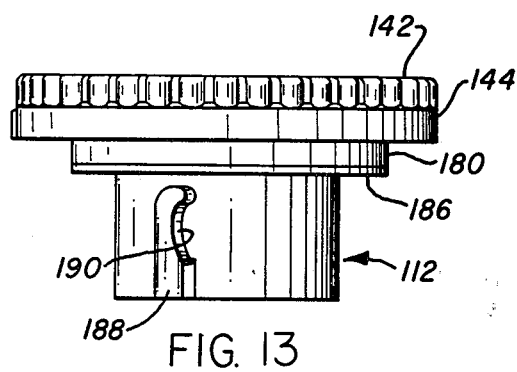
FIG. 13 is a front elevational view thereof.
Figure 14:
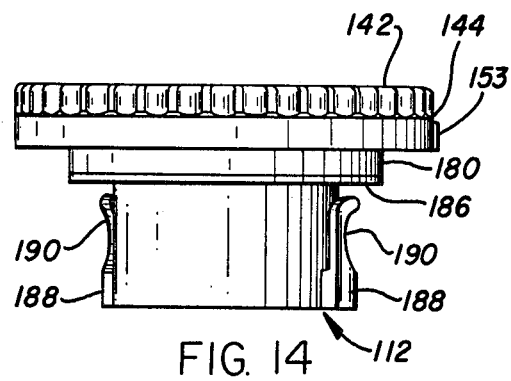
FIG. 14 is a side elevational view thereof.
Figure 15:
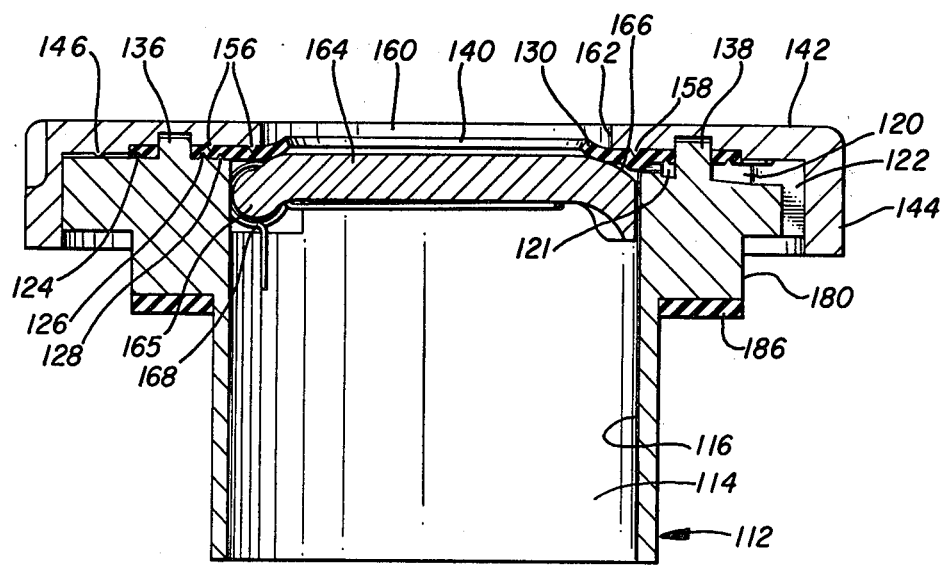
FIG. 15 is a cross-sectional view taken along line 15—15 of FIG. 11.

The upper surface 18 of closure body 12 has a plurality of concentric ribs 24, 26 and 28 which are adapted to hold a resilient receiving gasket 30 and prevent air from passing under the surface of the gasket 30. Transverse ribs 32 and 34 are secured between inner rib 26 and outer rib 28 to prevent passage of air into the vent groove 20 from under the gasket 30. A plurality of upwardly extending alignment pegs 36 are spaced about the periphery of the upper surface 18 of closure body 12. A vent groove alignment peg 38 holds the gasket in place within the groove 20. The alignment pegs 36 pass through aligned passages 37 formed in gasket 30 as best illustrated in FIG. 5.

The gasket 30 has a central passage 40 formed therein. A cap 42 having downwardly deflected sides 44 is secured to the upper surface 18 of closure body 12 by a welding head 46 formed on the lower surface 42a of cap 42. Counterbores 48 are formed in the lower surface 42a of cap 42 in spaced relationship and adapted to receive spaced alignment pegs 36 and closure body 12. Alignment pegs 36 preferably extend into the counterbores 48 but are spaced from the bottom surface of the counterbores 48 a distance, such as 0.020 inches, to allow full contact between the welding bead 46 and the upper surface 18 of closure body 12 because the lid will not flex. The welding bead 46 is melted by a sonic welding to rigidly secure the cap 42 to the body 12. Positioning lugs 50 on the outer periphery of the closure body 12 are aligned in positioning recesses 51 formed on the inner periphery of the downwardly deflected side 44 on cap 42. Lug 53 indicates the top which should be uppermost when the cap is attached to a filler neck.

A recess 52 having a shoulder 54 is formed in the bottom surface 42a of cap 42 to receive gasket 30. A pair of concentric pressure beads are formed in recess 52 and are adapted to engage the upper surface of gasket 30 when cap 42 is secured by welding bead 46 to the upper surface 18 of body 12 such that gasket 30 is frictionally held by beads 56 on cap 42 and beads 24, 26 and 28 on upper surface 18 of body 12.

A convex surface 58, as best illustrated in FIGS. 7 and 8, is formed on the lower surface 42a in recess 52 and adapted to urge the resilient gasket 30 downwardly to deflect the gasket 30 against the concave entrance surface 21a of vent groove 20 as will be more fully explained hereinafter. Convex surface 58 is preferably positioned along the inner wall of the concave entrance surface 21a.

An oblong, oval entrance passage 60 centrally formed in cap 42 has a flattened surface 62 formed at one end adjacent convex surface 58. A door 64 having a periphery formed by a curved surface 66 is adapted to form a closure over inlet passage 60. Means to pivotally urge the door to close inlet 60 comprises a resilient twin coil spring 68 secured about the outer ends of a rounded pin surface 65 on door 64 in recesses 70 formed in closure body 12. The curved surface 66 about the periphery of door 64 forms a non-catching surface to prevent hanging of the nozzle when inserted through the door 64. Recesses 72 formed in recess 52 are adapted to receive the gasket which is pushed up by a spring 68 when door 64 is placed in the assembly.

It should be readily apparent from the drawing that the central passage 40 in gasket 30 is preferably smaller than the oblong central passage 60 in cap 42. This allows the door to slightly deflect the gasket 30 upwardly about the corner formed by passage 60 to maintain an air tight seal. Door 64 is adapted to pivot downwardly and be positioned in a recess 76 formed in bore wall 16 of central passage 14 of body 12. The flattened surface 62 of central passage 60 in cap 42 limits upward movement of the door 64 and protects the gasket 30 to prevent damage to the seal vent groove 20 to maintain accurate opening pressure of the groove 20 as will be more fully explained hereinafter.

Beads 78 between recesses 72 urge the gasket 30 downwardly between the coil springs 68 to maintain an air tight seal.

The closure body 12 has a first shoulder 80 and a groove 82 formed therein. A resilient annular ring 84 is slideably disposed against first shoulder 80 and a resilient seal 86 is secured in groove 82. Annular ring 84 prevents distortion of seal 86 as the cap 10 is secured to the neck and aids in maintaining seal 86 in groove 82. Means to secure the cap 10 to the neck on the embodiment disclosed in FIGS. 1–10 comprises threads 88 formed on the exterior lower portion of closure body 12.

Figure 24:
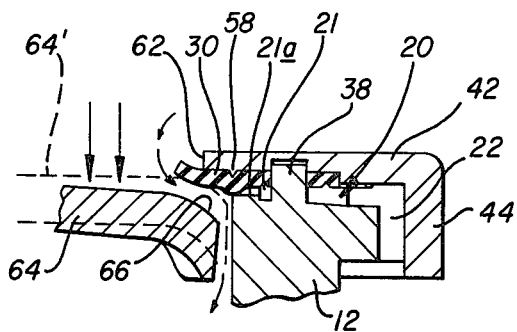
FIG. 24 is an enlarged diagrammatic view of the door opening to draw air into the tank.

Operation of the heretofore described invention is as follows:

When the pressure within the tank is below the pressure outside the tank, a pressure differential of one-half to one psig may result in a force of six to nine hundred pounds on the gasoline tank. The thin, flexible, galvanized metal of which tanks are usually constructed would be easily crushed under such force. As best illustrated in FIG. 24, when a pressure differential of one-half psig is formed such that the pressure is greater on the outside of the tank than inside, door 64 is deflected from a position shown in dashed outline 64' to the position shown in full outline such that air is vented into the gasoline tank filler neck through central passage 14. The spring 68 has sufficient force such that when pressure is equalized and the force caused by the air pressure on each side of door 64 is equal, door 64 is urged back into sealing relationship with gasket 30.

Figure 25:
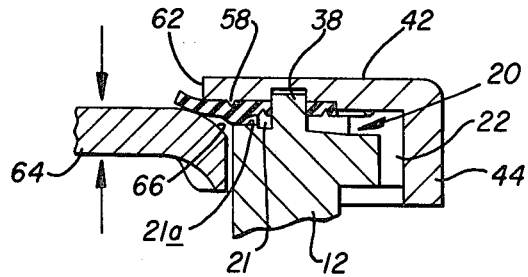
FIG. 25 is an enlarged diagrammatic view of the door shut.

As best illustrated in FIG. 25, the door 64 is in sealing relationship with gasket 30 urging the gasket through the opening 60 in cap 42. Further, vent groove 20 remains sealed at all times with equal pressure on both sides of door 64.

Figure 26:
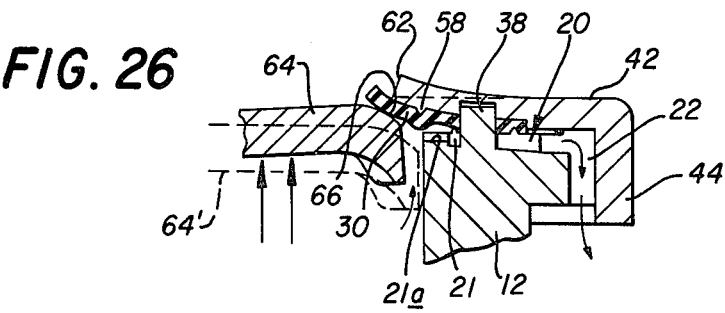
FIG. 26 is an enlarged perspective view of the vent relieving pressure to atmosphere.

As illustrated in FIG. 26, if the pressure within the tank exceeds the ambient atmosphere pressure by a predetermined pressure such as a maximum of 1½ psig outside the tank, the pressure forces the door 64 upward against the gasket 30. The flattened portion 62 of opening 60 is deflected upwards by the force of the vapor within the gas tank. As this occurs convex surface 58 is deflected upwardly slightly and the resilient gasket 30 is forced upwardly to allow pressure to escape through vent groove 20 from the first end 21 to the second end 22 and vented to atmospheric pressure. As pressure equalizes from the ambient atmosphere and within the tank, door 64 moves back to its normal position illustrated in FIG. 25 and the vent 20 is once again closed.

The vent is designed to minimize loss of gas vapor while maintaining the tank pressure at a −½ psig of 2 psig in relationship to the ambient atmospheric pressure.

The center peg 38 in vent groove 20 prevents the gasket 30 from being pulled out of position when the nozzle is removed from the filler cap 10.

It should be readily apparent that the oblong oval hole 60 within the cap 42 permits movement to an open position without obstructing the nozzle as it moves into and out of the cap without binding the door and allows alignment of the nozzle with existing secondary unleaded doors and vehicles which must receive only unleaded gas. It is preferred that door 64 open the same direction as the unleaded door in the filler neck to facilitate insertion of the nozzle.

It should further be readily apparent that the first end 21 is shaped narrow and shallow to prevent collapsing of the gasket 30 under extreme conditions.

When the nozzle is to be inserted through the cap 10, the nozzle engages the upper surface of door 64 and as it is forced through opening 60 the door is deflected downwardly into recess 76 of closure body 12. The nozzle is withdrawn from the opening 60 in a reverse manner.

It should be readily apparent that spring 68 should have sufficient force to urge door 64 into sealing relationship with the lower side of gasket 30, but should not be so strong as to prevent air pressure from equalizing the pressure within the tank.

A modified form of the gas cap 10 is illustrated in FIGS. 11–15 and like parts are designated by the same numeral of the first embodiment preceded by one, for example, the gas cap is designated 110.

The exterior of the closure body 112 has a first shoulder 180 having a resilient flattened gasket 186 secured against the lower side thereof. The embodiment illustrated in FIGS. 11–15 is particularly adapted to be attached to Ford products.

Means to secure the gas cap 110 to the filler neck generally comprises curved cam surfaces 188 intermediate upper and lower ends of body 112 having a concave surface 190 adapted to fit in a slot formed in the filler neck (not shown). The operation and description of all other parts is the same and further description is not deemed necessary.

A third embodiment of the invention is illustrated in FIGS. 16–20 and like parts are generally designated by the same numeral as the first embodiment preceded by the numeral 2 for example, the cap is designated 210. A shortened closure body 212 having a first shoulder 280 and a lower surface 282 receives a seal 286 for sealing against the filler neck.

Means to secure the gas cap 212 to the filler neck generally comprises circumferentially spaced projections such as hooks 288 having detents 290 formed in the upper side to form a shoulder to secure the cap on the filler neck.

The embodiment illustrated in FIGS. 16–20 is particularly adapted to fit on Chrysler product filler tank necks.

Operation of the hereinbefore described modified form 210 is substantially the same as that for a gas cap 10.

Figure 21:
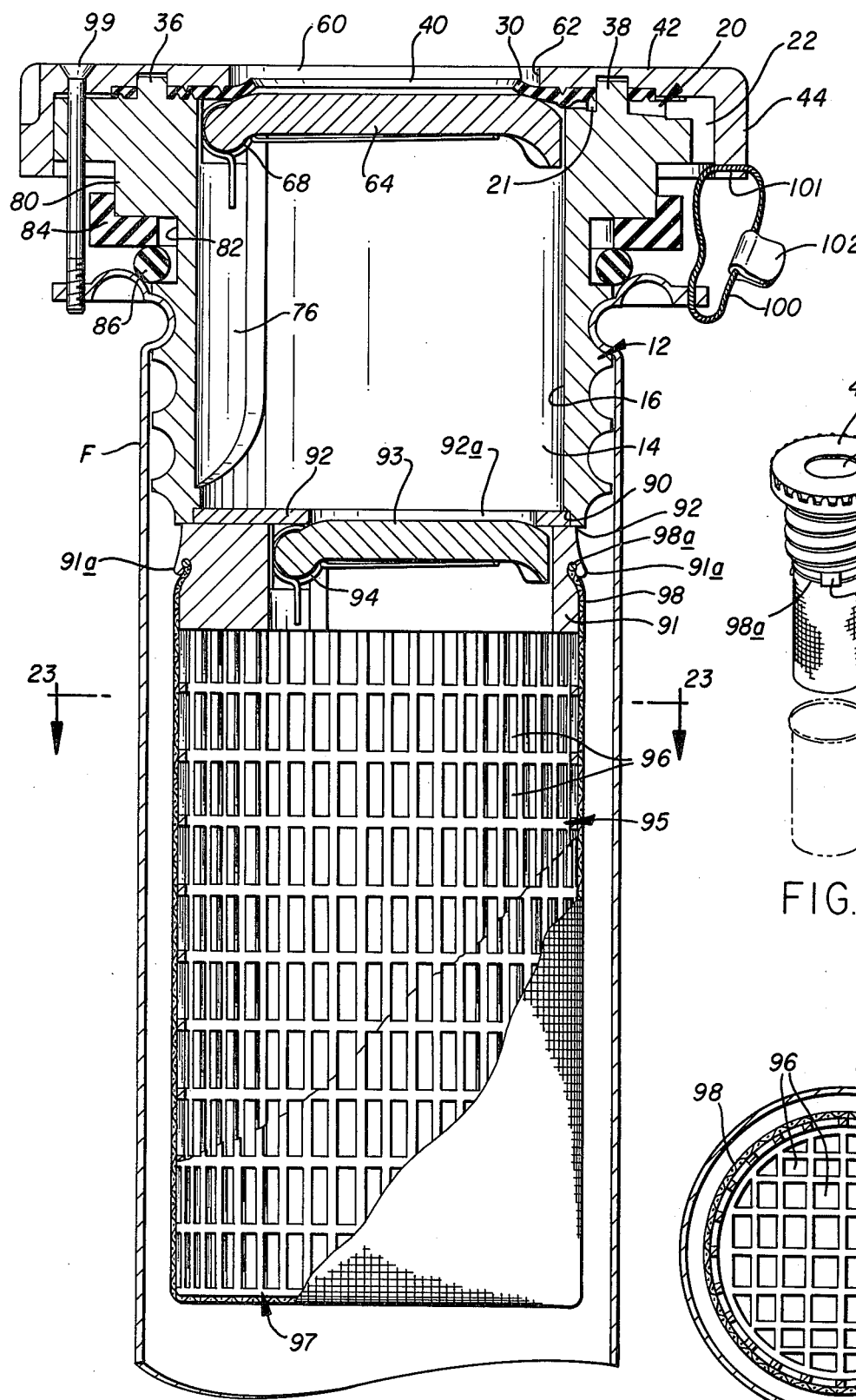
FIG. 21 is a cross-sectional view of a fourth modified form of the gas cap showing an unleaded door opening and filter screen secured to the lower portion of the gas cap.
Figure 22:
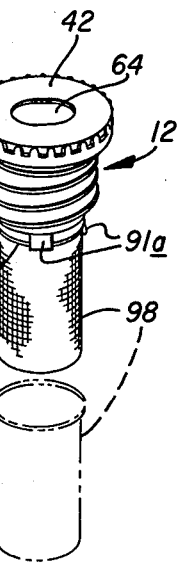
FIG. 22 is a perspective view thereof.
Figure 23:
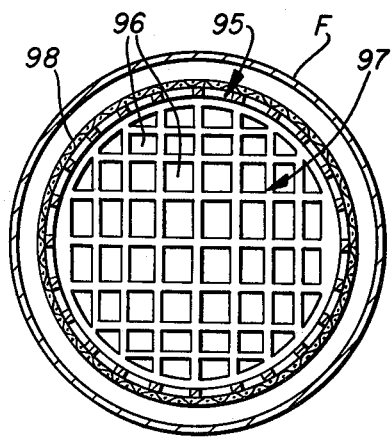
FIG. 23 is a cross-sectional view taken along line 23—23 of FIG. 21.

As illustrated in FIGS. 21–23, the fourth modified form of the invention generally comprises a gas cap in which the upper portion is comprised of one of the first three embodiments of the cap, for example, gas cap 10. An additional shoulder 90 is formed in the lower end of closure body 12. A lower body 91 having an annular lid 92 secured to the upper end thereof is sonically welded at 92 to the lower end of gas cap 10.

Lid 92 has an opening 92a formed therethrough which is offset such that the nozzle passing through door 64 which is normally curved will pass through door 93 which is pivotally secured and urged by spring 94 against opening 92a.

Lower body 91 has a cylindrical inner mesh body 95 having a plurality of openings 96 formed therein and lower bottom 97 formed therein to prevent a syphon hose from being pushed through doors 64 and 93 into the tank to remove gasoline. An outer screen 98 secured over the bottom 97 and inner mesh bottom 96 to filter contaminates from gasoline prior to flowing into the tank. Filter 98 is secured by fingers 91a which are resiliently urged against the upper end of the filter 98. A wire ring 98a is secured to the upper end of the filter 98 to secure the filter under fingers 91a. Removal of the filter 98 for cleaning or replacement is accomplished by lifting fingers 91a allowing the ring 98a to drop out of fingers 91a to the position shown in dashed outline in FIG. 22.

The cap 10 is secured to the upper end of filler neck F and if deemed desirable to do so may be secured against removal by locking means such as screw 99 and a wire 100 which is secured to the filler neck F and a opening 101 in cap 42 and secured there by a lead wire seal 102.

The invention illustrated in FIGS. 21–23 is adapted to fit on vehicles requiring unleaded gasoline and thus the opening 92a in lid 92 is of a predetermined size to restrict passage of nozzles above a predetermined diameter into the tank as required by the EPA standards. The cap is designed to replace the secondary door in the filler neck and provide a filter and anti-theft device secured into one unit.

Having described my invention, I claim:

1. A closure for a filler neck on a tank, comprising: a closure body including means for securing said closure to the filler neck, a lower end adapted to fit within the filler neck, an upper surface having a vent groove formed therein, and a passage extending through the upper surface and through the lower end, the vent groove having a first end communicating with the passage through the closure body and a second end communicating with the periphery of the closure body; a cap secured to the closure body for covering the upper surface, said cap having an opening extending therethrough and communicating with the passage in said closure body; a convex surface on said cap disposed adjacent the vent groove; a resilient gasket disposed between said cap and said closure body, said gasket having a passage through which the passage in said closure body and the opening in the cap communicate, said resilient gasket being deflected by the convex surface on said cap to close the vent groove, and being sufficiently resilient to permit passage of a fluid through the groove when a pressure differential exceeding approximately one-half pound per square inch exists between the first and second ends of the groove; and means in said passage in the closure body to close the passage in the gasket to prevent flow of fluid therethrough from the tank.

2. The closure of claim 1, said means in said passage including a door having a periphery formed by a curved surface; means for pivotally urging said door toward a position closing said central passage and into sealing engagement with said gasket.

3. The closure of claim 2, wherein the upper surface on said closure body includes an upwardly extending rib extending around the passage, said rib engaging said resilient gasket to limit movement of said gasket relative to the upper surface.

4. The closure of claim 3, wherein said gasket includes an aperture extending therethrough; and said upper surface of said closure having an upwardly extending peg, said peg extending into said aperture of said gasket to limit movement of said gasket relative to said upper surface.

5. The closure of claim 2, including: a second door adapted to close an opening formed in the lower end of said closure body; and means pivotally securing said second door in spaced relation below said first door such that a gasoline nozzle must travel through said first and second doors.

6. The closure of claim 2, wherein said door is oblong in shape to allow passage of a nozzle without obstruction.

7. The closure of claim 1, wherein the securing means of said closure body includes threads formed on its lower end.

8. The closure of claim 1, wherein the securing means of said closure body includes circumferentially spaced projections adjacent its lower end.

9. The closure of claim 8, wherein the projections include: curved cam surfaces intermediate the upper and lower ends of said closure body.

10. The closure of claim 8, wherein the projections include: hooks extending downwardly from the lower end of said closure body.

11. The closure of claim 1, including: a filter secured to the lower end of said closure body for filtering the gasoline flowing into the tank.

12. The closure of claim 11, including: a second door adapted to close an opening formed in the lower portion of said closure body; and means pivotally securing said second door in spaced relationship below said first door such that the gasoline nozzle must travel through both doors to communicate with the tank.

13. A closure for a filler neck on a gas tank, comprising: a closure body including means for securing said closure to the filler neck, said closure body having a lower end adapted to fit within the filler neck, an upper surface having a vent groove formed therein, and a passage extending through the upper surface and through the lower end, the vent groove having a first end communicating with the passage and a second end communicating with the periphery of the closure body; a cap covering the upper surface of said closure body including an opening communicating with the passage in said closure body and a convex surface on said cap; a resilient gasket between said cap and said closure body, said convex surface on said cap being positioned to deflect said gasket to close the vent groove; means movably secured to the closure body to move said gasket to vent the filler neck through the vent groove when pressure at the first end of the groove exceeds a predetermined amount relative to the pressure at the second end of the groove, the movably secured means further acting to admit air into the tank through the passage in the closure body between said movably secured means and said gasket when atmospheric pressure exceeds pressure in the tank by a predetermined amount.

14. The closure according to claim 13, wherein said movably secured means is further adapted to vent a gas tank if the pressure at the second end of the groove exceeds the pressure at the first end of the groove by an amount greater than one-half pound per square inch.

15. The closure according to 13, wherein said movably secured means includes a door pivotally secured in the passage of said closure body and resiliently urged into engagement with said gasket.

16. A closure for a filler neck on a gas tank, comprising: a tubular closure body having a central passage therethrough; a door pivotally secured to said closure body for closing said central passage; a frame secured to the lower end of said closure body adapted to slide therewith into the filler neck, said frame having a plurality of passages for communicating with the filler neck; a filter screen adapted to slide over said frame; a wire ring secured to the upper end of the filter; and fingers spaced about the frame resiliently urging said wire ring against said frame to detachably secure the filter to the frame.

17. A closure for a filler neck on a gas tank, comprising: a closure body including means for securing said closure to the filler neck, a lower end adapted to fit within the filler neck, an upper surface having a vent groove formed therein, and a passage extending through the closure body, through the upper surface and through the lower end, the vent groove having a first end communicating with the passage and a second end communicating with the periphery of the closure body; a cap covering the upper surface and secured to said closure body, said cap having an opening aligned with the passage in said closure body, a convex surface on said cap extending toward the vent groove, and a deflectable portion disposed adjacent the convex surface; a resilient gasket disposed between said cap and said closure body being deflected by the convex surface of said cap to close the groove, said gasket having a passage communicating with the passage in said closure body and the opening in said cap; and closing means moveably secured to said closure body to normally close the passage through said gasket, said closing means being moveable to open the passage through the gasket if ambient pressure outside the tank exceeds the pressure within the tank by a predetermined amount and to deflect the deflectable portion of said cap to open said vent groove when pressure within the tank exceeds ambient pressure outside the tank by a predetermined amount.

18. A closure for a filler neck on a gas tank, comprising: a tubular closure body having a central passage therethrough; a door pivotally secured to said closure body for closing said central passage; a frame secured to the lower end of said closure body adapted to slide therewith into the filler neck, said frame having a plurality of passages for communicating with the filler neck; a second door positioned at the lower end of said closure body; and means resiliently urging said second door to close the central passage formed in the closure body; a filter screen adapted to slide over said frame; resilient means positioned adjacent the juncture of the frame and closure body for detachably securing said screen to said frame such that said screen may be removed.

* * * * *